(12) United States Patent
Kubo et al.

(10) Patent No.: US 8,161,298 B2
(45) Date of Patent: Apr. 17, 2012

(54) POWER SUPPLY CONTROLLING CIRCUIT AND SCANNER UNIT

(75) Inventors: Satoshi Kubo, Kahoku (JP); Kouhei Dake, Kahoku (JP); Hiroyuki Ichii, Kahoku (JP)

(73) Assignee: PFU Limited, Ishikawa (JP)

( * ) Notice: Subject to any disclaimer, the term of this patent is extended or adjusted under 35 U.S.C. 154(b) by 1072 days.

(21) Appl. No.: 11/905,967

(22) Filed: Oct. 5, 2007

(65) Prior Publication Data

US 2008/0229124 A1 Sep. 18, 2008

(30) Foreign Application Priority Data

Mar. 14, 2007 (JP) .................. P2007-065092

(51) Int. Cl.
*G06F 1/00* (2006.01)
*G06F 3/00* (2006.01)
*G06F 13/42* (2006.01)
*G06F 13/20* (2006.01)
*G02B 5/32* (2006.01)
*G02B 26/08* (2006.01)

(52) U.S. Cl. .......... 713/300; 713/340; 710/14; 710/105; 710/313; 359/17; 359/202.1

(58) Field of Classification Search .................. 713/300, 713/340; 710/14, 105, 313; 359/17, 202.1
See application file for complete search history.

(56) References Cited

U.S. PATENT DOCUMENTS

| | | | |
|---|---|---|---|
| 5,678,005 A | 10/1997 | Taylor | |
| 6,003,138 A | 12/1999 | Chung | |
| 6,283,789 B1 | 9/2001 | Tsai | |
| 6,704,124 B2 | 3/2004 | Hu et al. | |
| 6,934,863 B2 * | 8/2005 | Yin | 713/300 |
| 7,043,646 B2 * | 5/2006 | Enami et al. | 713/300 |
| 2005/0141208 A1 * | 6/2005 | Niinuma | 361/797 |
| 2008/0082842 A1 * | 4/2008 | Minami | 713/300 |
| 2008/0122292 A1 * | 5/2008 | Minami | 307/44 |

FOREIGN PATENT DOCUMENTS

| | | |
|---|---|---|
| CN | 1318812 A | 10/2001 |
| JP | 2001-358908 | 12/2001 |
| JP | 2005-141732 | 6/2005 |

OTHER PUBLICATIONS

Chinese Office Action issued Mar. 1, 2010 in corresponding Chinese Patent Application 200710162836.1.
Japanese Office Action issued on Jan. 27, 2011 in corresponding Japanese patent application No. 2007-065092.

* cited by examiner

*Primary Examiner* — Stefan Stoynov (57) ABSTRACT

A power supply controlling circuit includes: power supplied portions, adapted to receive power supply from at least one external apparatus; a first power unit, adapted to be driven by a first power; and a second power unit, adapted to be driven by a second power. In response to a change of the power supply, the second power is varied, while the first power is maintained.

8 Claims, 7 Drawing Sheets

FIG. 2A
WHEN AC ADAPTOR IS CONNECTED

FIG. 2B
WHEN POWER SUPPLY CABLE IS CONNECTED

FIG. 2C
POWER SUPPLY TO APPARATUS AND OPERATION OF APPARATUS

| DC-INLET CONNECTION | USB CONNECTOR | DC-INLET | OPERATION OF APPARATUS |
|---|---|---|---|
| AC ADAPTOR CONNECTION | ×: NO POWER SUPPLY | O: 7.2V | ONLY POWER SUPPLY FROM THE AC ADAPTOR |
| POWER SUPPLY CABLE CONNECTION | O: 5V, 500mA | O: 5V, 500mA | (5V, 500mA)×2 FROM INFORMATION PROCESSING APPARATUS |

POWER SUPPLY CONTROLLING CIRCUIT AND SCANNER UNIT

BACKGROUND OF THE INVENTION

The present invention relates to a power supply controlling circuit and a scanner unit constructed to have a two-system power supplied portion used to receive a power supply from an information processing apparatus such, as a computer or the like, or an external power source.

With the recent reduction in size and weight of a computer or a scanner unit, the opportunity of carrying a computer or a scanner unit with a user and using it outside or in a place where the user has gone to arises very often. For this purpose, a portable computer or a portable scanner unit has been developed by reducing size and weight of the desktop computer or the desktop scanner unit. The scanner unit is designed such that this unit is carried together with the portable computer such as a notebook computer, a mobile computer, or the like.

Among the scanner units, nowadays the scanner unit that can receive a power supply from an external computer via the interface that transfers read image data to the external computer, like the USB (Universal Serial Bus) interface, for example, has been developed.

This scanner unit aims at controlling adequately a power consumption in the scanner unit that receives a power supply via a connection cable from the computer or from the external power source to operate. Such scanner unit executes a reading operation in a normal mode when the external power source is connected, and executes the reading operation in a power saving mode when the external power source is not connected. However, the technology to control adequately the two-system power supplied portion that is used to receive the power supply from the information processing apparatus such as the computer, or the like is neither disclosed nor suggested (for example, refer to JP-A-2001-358908).

As discussed above, the technology in the related art confronts the problems given as follows.

The scanner unit in the related art receives a power supply from the computer via one USB cable when it receives the power supply via the connection cable from the computer. Therefore, normally a peak current is limited, and thus it is impossible to feed stably a sufficient power in contrast to the case where the AC power source (external power source) is used.

Recently, most of computers are equipped with at least two USB ports.

In the scanner unit, it is desired that a consumption power of the scanner unit itself should be reduced as small as possible and also a reduction in an original reading speed of and a processing speed containing the transfer of read image data to the external computer should be suppressed to the utmost by supplying the power stably to the driving portion of the scanner unit to execute a reading operation.

SUMMARY

It is therefore an object of the invention to provide a power supply controlling circuit and a scanner unit, being capable of receiving a power supply from two USB ports provided with an information processing apparatus such as an external computer, or the like when the information processing apparatus is connected thereto.

It is also an object of the invention to provide a power supply controlling circuit and a scanner unit, being capable of controlling adequately a two-system power supply in both the case where a power is supplied from an AC power source as an external power source via an AC adaptor and the case where a power is supplied from two USB ports provided with an information processing apparatus without connection of the external power source.

In order to achieve the object, according to the invention, there is provided a power supply controlling circuit, comprising:
power supplied portions, adapted to receive power supply from at least one external apparatus;
a first power unit, adapted to be driven by a first power; and
a second power unit, adapted to be driven by a second power, wherein
in response to a change of the power supply, the second power is varied, while the first power is maintained.

The power supplied portions may include a first power supplied portion and a second power supplied portion. The at least one external apparatus may include an AC adaptor and an information processing apparatus including a first and second USB interfaces. The first power supplied portion may be connected to the first USB interface of the information processing apparatus. The second power supplied portion may be selectively connected to the second USB interface of the information processing apparatus and the AC adaptor.

According to the invention there is provided a scanner unit, incorporating the power supply controlling circuit, and connected to the information processing apparatus.

The power supply controlling circuit may output an informing signal indicating a power supply mode to the information processing apparatus.

According to the invention, there is also provided a power supply controller, comprising:
a first portion, connected to a first port of a first external apparatus;
a second portion, connected to one of a second port of the first external apparatus and a second external apparatus;
a power unit, adapted to receive a power supply from the second external apparatus when the second portion is connected to the second external apparatus, and adapted to receive a power supply from the first external apparatus when the second portion is connected to the second port of the first external apparatus.

The power unit may include a first power unit and a second power unit. The power supply received by the power unit may include a first power received by the first power unit and a second power received by the second power unit. The first power may be constantly maintained and the second power may be variable.

DETAIL DESCRIPTION OF PREFERRED EMBODIMENTS

The best mode for carrying out the present invention will be explained with reference to FIG. 1A to FIG. 7 hereinafter.

Figure 2A:
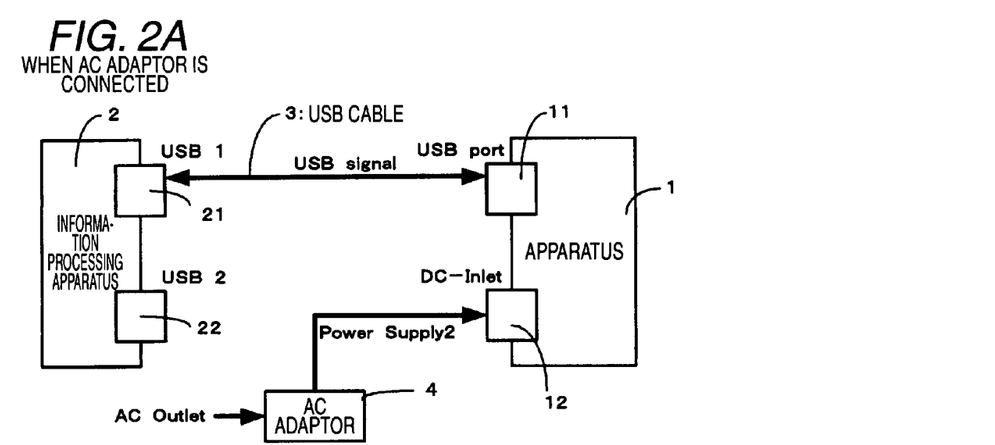
FIGS. 2A, 2B and 2C are explanatory views of connections and power supply of the present invention.
Figure 2B:
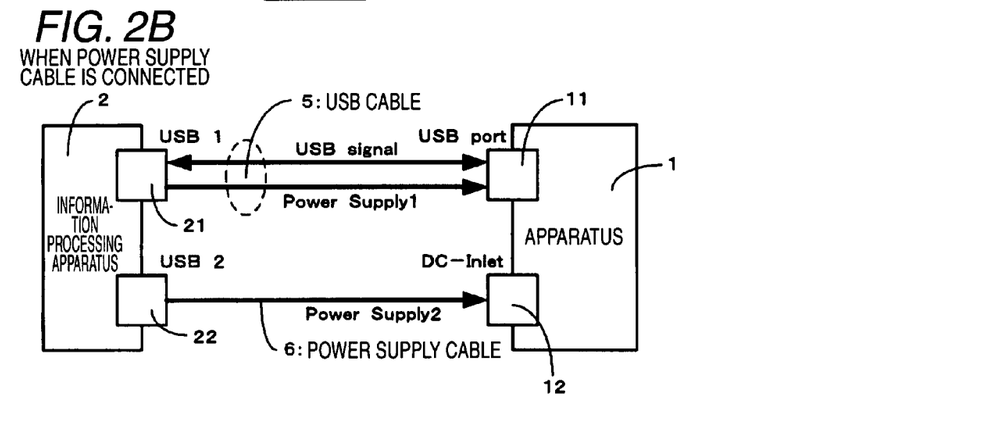

In FIG. 2A and FIG. 2B, an apparatus 1 such as a scanner unit, or the like is equipped with a USB port 11 and a DC-Inlet 12, and an information processing apparatus 2 such as a computer, or the like is equipped with a USB connector 21 and a USB connector 22. FIG. 2A shows a situation that an AC adaptor is connected, and the DC-Inlet 12 receives a power supply from an AC power source as an external power source via an AC adaptor 4. Also, a USB cable 3 is connected to the USB port 11 and the USB connector 21, and data, for example image data is communicated between the apparatus 1 and the information processing apparatus 2 through the USB cable 3.

FIG. 2B shows how a power supply cable is connected when the apparatus 1 receives a power supply from two USB ports provided with the information processing apparatus 2. A USB cable 5 is connected to the USB port 11 and the USB connector 21 to execute data communication between the apparatus 1 and the information processing apparatus 2, and also the apparatus 1 receives a power supply from the information processing apparatus 2. Further, a power supply cable 6 is connected to the DC-Inlet 12 and the USB connector 22, and also the apparatus 1 receives a power supply from the information processing apparatus 2. In short, the apparatus 1 receives a power supply from two USB ports provided with the information processing apparatus 2.

Figure 2C:
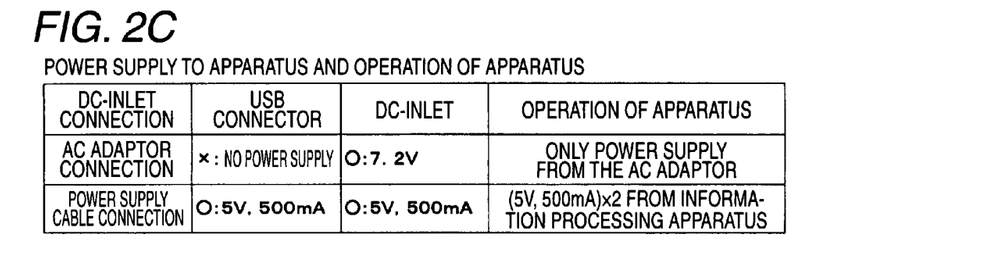

FIG. 2C explains a power supply to the apparatus 1 and an operation of the apparatus 1. When the AC adaptor 4 is connected to the DC-Inlet 12, no power is supplied to the USB port 11. At this time, 7.2 V is applied to the DC-Inlet 12 and the apparatus 1 is operated only by the power supply from the AC adaptor 4.

In contrast, when the power supply cable 6 is connected to the DC-Inlet 12, 5 V, 500 mA are supplied to both the USB port 11 and the DC-Inlet 12. At this time, the apparatus 1 receives a power supply from two USB ports that are provided with the information processing apparatus 2, and is operated by the power.

Figure 3:
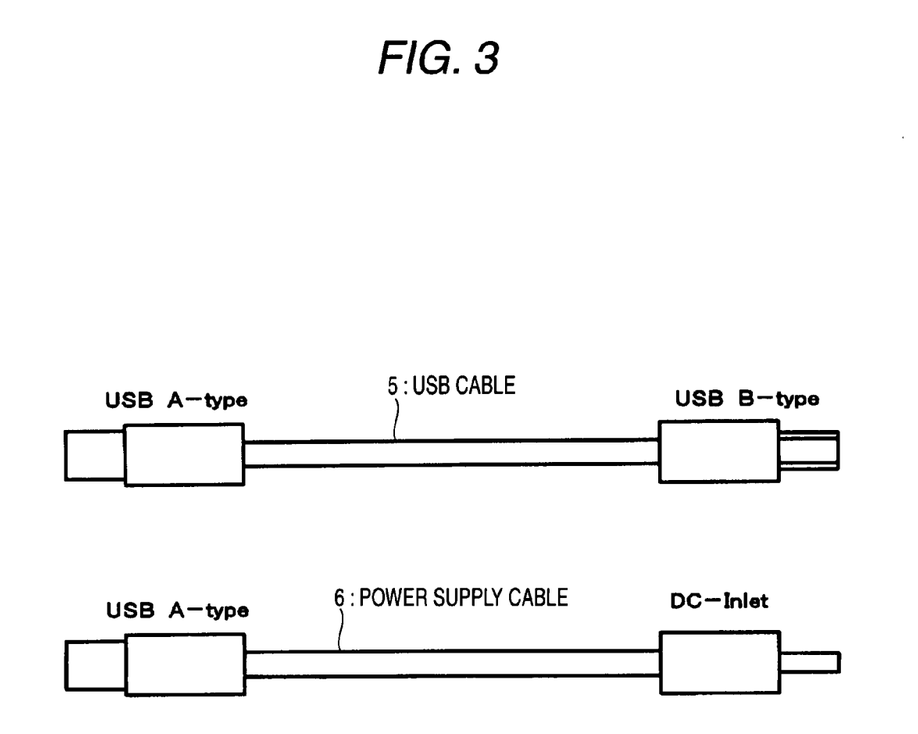
FIG. 3 is an explanatory view of a connection cable of the present invention.

Here, external views of the USB cable 5 and the power supply cable 6 used when the power supply cable is connected are shown in FIG. 3.

Figure 1A:
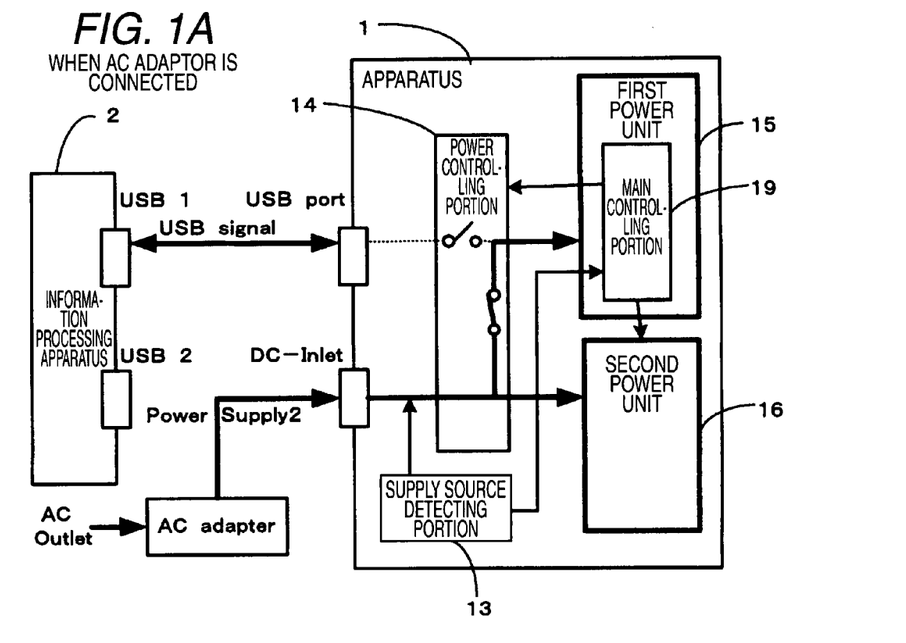
FIGS. 1A and 1B are views showing the basic principle of the present invention.

A power supply controlling circuit of the present invention will be explained hereafter. FIG. 1A shows a power supply controlling circuit used when an AC adaptor is connected and the power supply controlling circuit receives a power supply via the AC adaptor from an external power source, and FIG. 1B shows a power supply controlling circuit used when a power supply cable is connected and the power supply controlling circuit receives a power supply from two USB ports provided with an information processing apparatus without connection of an external power source.

Figure 1B:
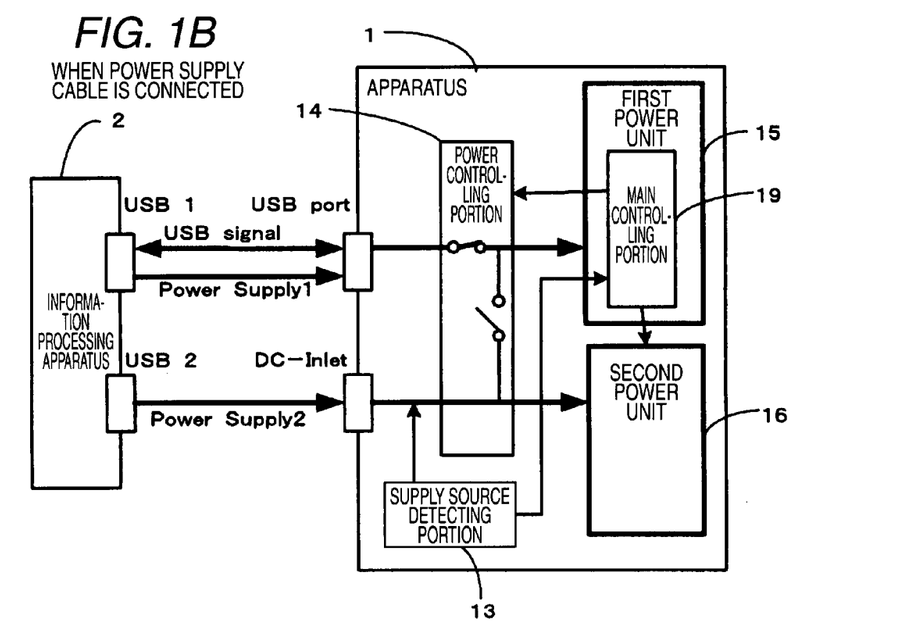

In FIG. 1A and FIG. 1B, an apparatus 1 such as a scanner unit, or the like is equipped with a supply source detecting portion 13, a power controlling portion 14, a first power unit 15, and a second power unit 16. The supply source detecting portion 13 detects the supply power source connected to the DC-Inlet 12, by detecting a voltage of the power supplied to the DC-Inlet 12. The power controlling portion 14 switches the power supply such that the supplied power is fed to both the first power unit 15 and the second power unit 16. In this case, the first power unit 15 may be constructed as a logic circuit system, and the second power unit 16 may be constructed as a driving system. Also, the supply source detecting portion 13 may detect an electric current supplied to the DC-Inlet 12.

As shown in FIG. 1A, a main controlling portion 19 provided with the first power unit 15 changes the first power unit 15 and the second power unit 16 into a normal power operation (normal power operation mode) when the AC adaptor is connected.

In contrast, the main controlling portion 19 changes the second power unit 16 into a power saving operation (power saving operation mode) in which less power is required than that required in the normal power operation, when the power supply cable is connected. Also, the first power unit 15 is set to the normal power operation. In this case, the second power unit 16 may be changed into a plurality of power saving operations in response to a level of the voltage applied when the power supply cable is connected.

Next, a scanner unit equipped with a power supply controlling circuit will be explained hereunder. In this case, the similar reference symbols to those in the above have the similar functions, and thus their explanation will be omitted herein at need.

Figure 4:
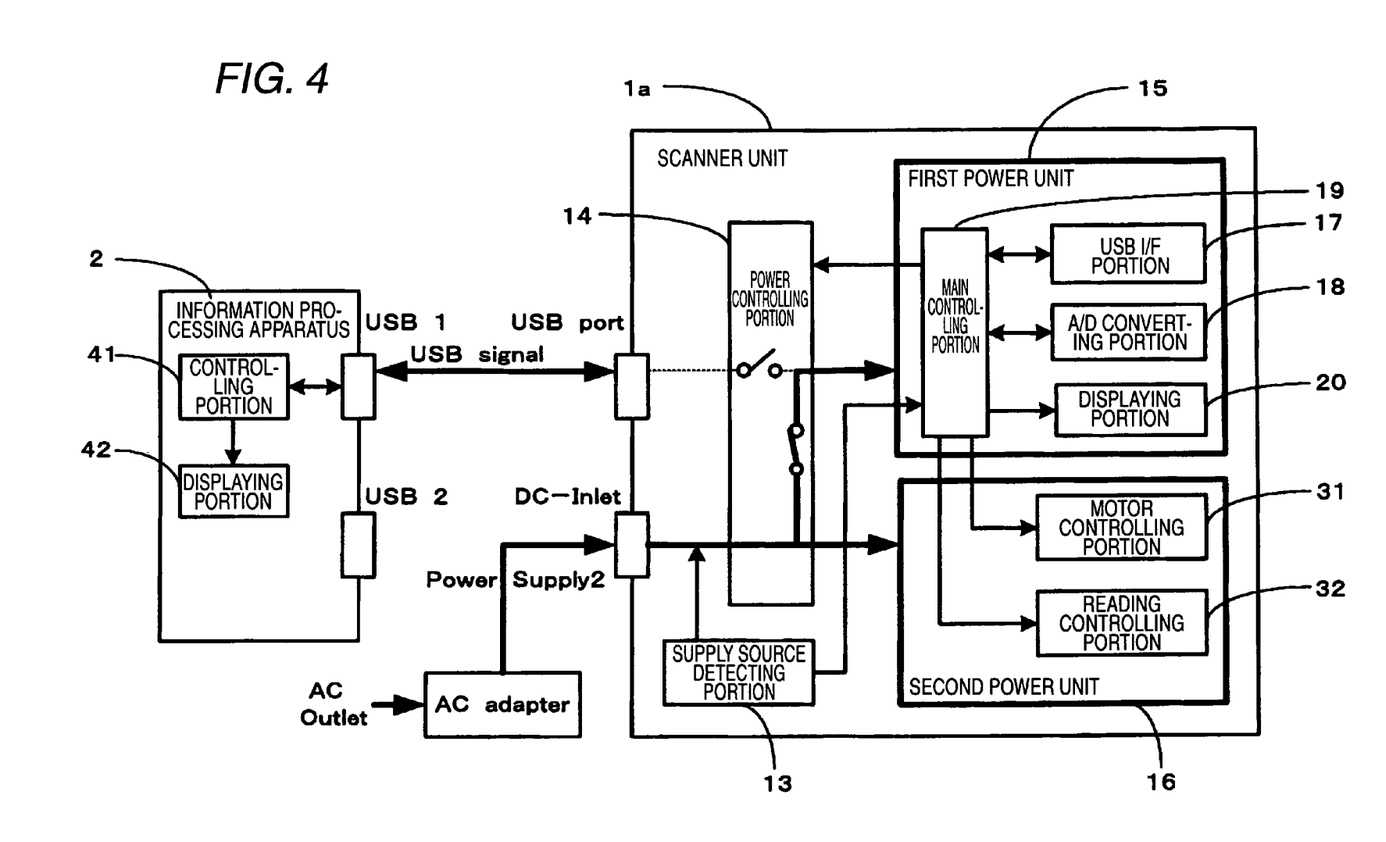
FIG. 4 is an explanatory view showing how an AC adaptor is connected in the present invention.
Figure 5:
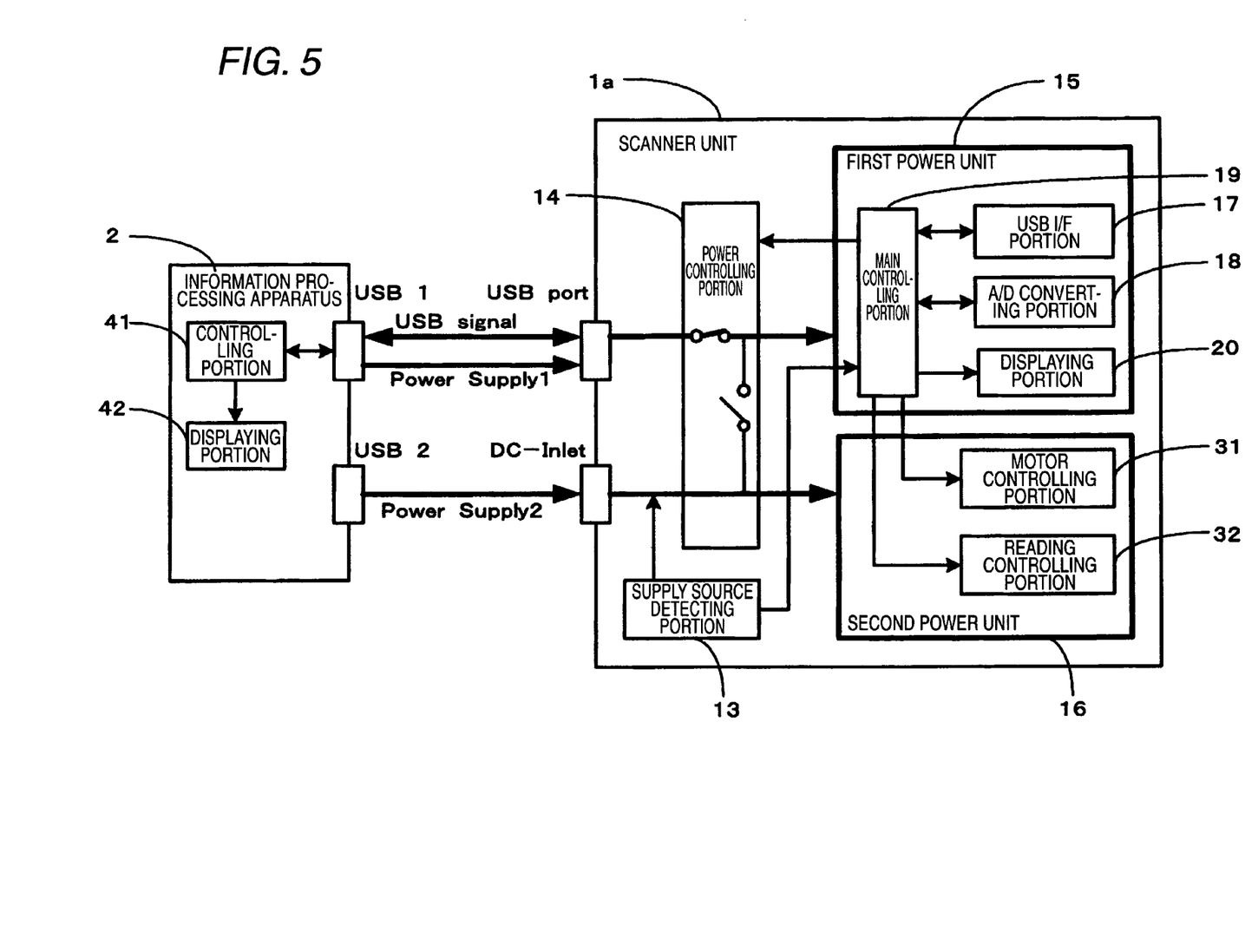
FIG. 5 is an explanatory view showing how a power supply cable is connected in the present invention.

FIG. 4 shows a case where an AC adaptor is connected, and FIG. 5 shows a case where a power supply cable is connected. In FIG. 4 and FIG. 5, a scanner unit 1a is equipped with a supply source detecting portion 13, a power controlling portion 14, a first power unit 15, and a second power unit 16. The first power unit 15 includes a main controlling portion 19, a USB interface portion 17, an A/D converting portion 18, and a displaying portion 20. The second power unit 16 includes a motor controlling portion 31 and a reading controlling portion 32. An information processing apparatus 2 such as a computer, or the like includes a controlling portion 41 and a displaying portion 42, and two USB ports.

The motor controlling portion 31 controls a moving portion, such as a driving motor that drives transport rollers (not shown) of an auto document feeder (abbreviated as "ADF" hereinafter) for transporting a reading paper. The reading controlling portion 32 controls a quantity of light (driving power) of an LED light source portion CIS (Contact Image Sensor), which illuminates a reading paper. The A/D converting portion 18 converts an image signal being output by reading an image of a reading paper into digital pixel data. The controlling portion 41 controls the information processing apparatus 2. The displaying portions 20 and 42 inform of a power supply condition indicating which one of the AC adaptor connection and the power supply cable connection is employed.

As shown in FIG. 4, the main controlling portion 19 provided with the first power unit 15 changes the first power unit 15 and the second power unit 16 into a normal power operation while the AC adaptor is connected.

In contrast, as shown in FIG. 5, the main controlling portion 19 changes the second power unit 16 into a power saving operation in which less power is required than that required in the normal power operation, when the power supply cable is connected. In this case, the first power unit 15 is set to a normal power operation. More particularly, the main controlling portion 19 causes the motor controlling portion 31 provided with the second power unit 16 to control the moving portion such as the driving motor for driving the transport rollers (not shown) to transport the reading paper such that its operation speed is made slow when the power supply cable is connected. Also, the main controlling portion 19 causes the reading controlling portion 32 provided with the second power unit 16 to control such that a quantity of light of the LED light source portion of CIS, which illuminates the reading paper is reduced. In this case, the first power unit 15 is set to a normal power operation.

Figure 6:
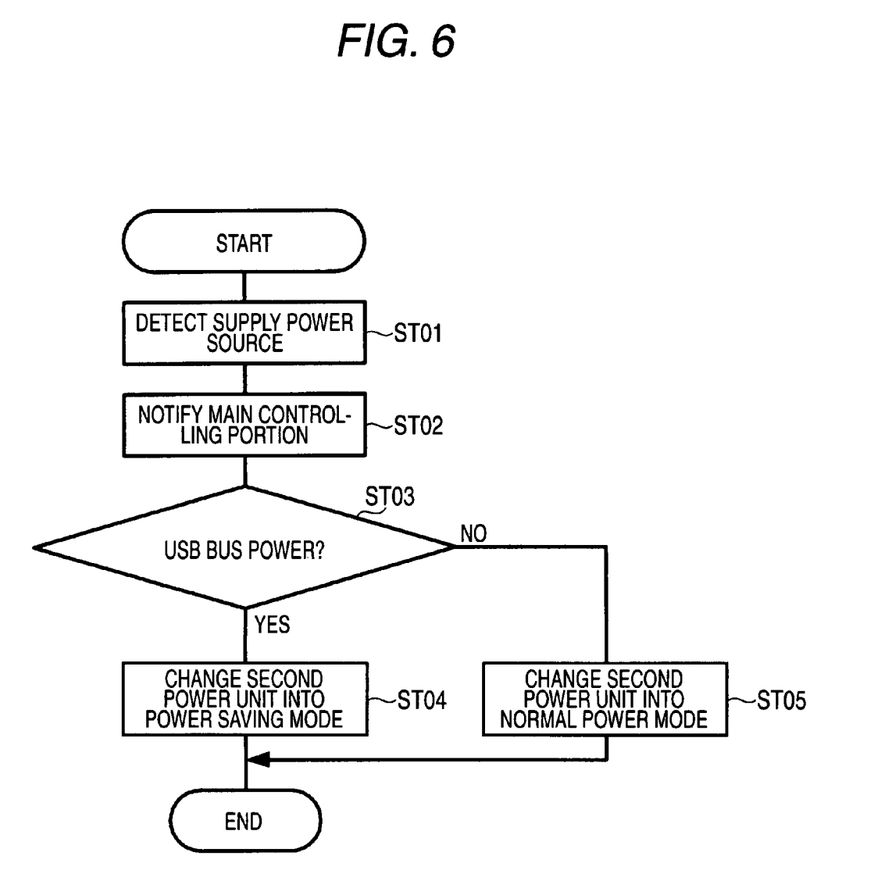
FIG. 6 is a flowchart explaining the present invention.

Next, procedures of changing a consumption power of a scanner unit with reference to FIG. 6 hereafter.

In step ST01, the supply source detecting portion 13 detects a supply power source connected to the DC-Inlet 12, by detecting a voltage of the power supplied to the DC-Inlet 12. Then, in step ST02, the supply source detecting portion 13 notifies the main controlling portion 19 of the supply power source. In step ST03, the main controlling portion 19 decides whether or not the supplied power is a USB bus power. If the supplied power is the USB bus power, the process goes to step ST04. If the supplied power is not the USB bus power, the process goes to step ST05. In step ST04, the main controlling portion 19 changes the motor controlling portion 31 and the reading controlling portion 32 provided with the second power unit 16 into a power saving mode. In step ST05, the main controlling portion 19 changes the motor controlling portion 31 and the reading controlling portion 32 provided with the second power unit 16 into a normal power mode. Then, the process is ended.

Figure 7:
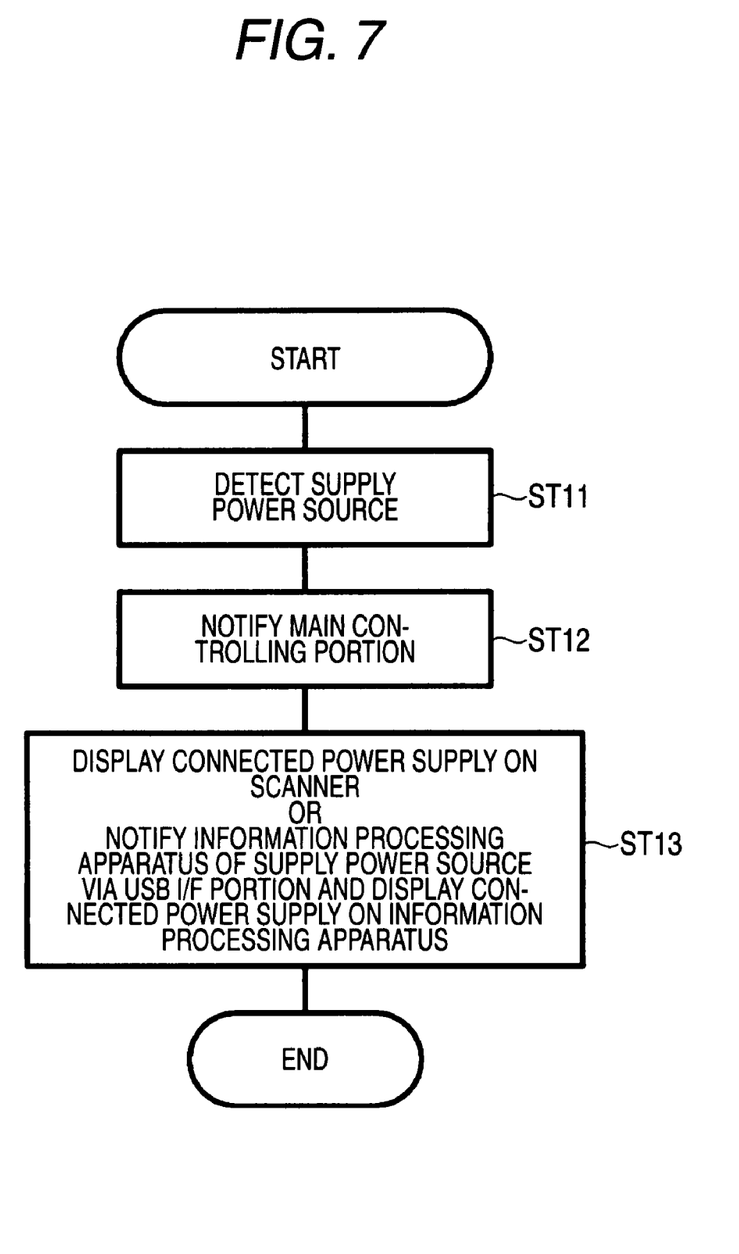
FIG. 7 is a flowchart informing a power supplying state of the present invention.

Next, procedures of notifying of a power supplying state of a scanner unit will be explained with reference to FIG. 7 hereafter.

In step ST11, the supply source detecting portion 13 detects the supply power source connected to the DC-Inlet 12 by detecting a voltage of the power supplied to the DC-Inlet 12. In step ST12, the supply source detecting portion 13 notifies the main controlling portion 19 of the supply power source. In step ST13, the main controlling portion 19 displays an indication that permits the user to recognize the connected power supply, on the displaying portion 20 provided with the scanner 1a. Otherwise, the main controlling portion 19 notifies the information processing apparatus 2 of the supply power source via the USB interface portion 17, and causes the controlling portion 41 provided with the information processing apparatus 2 to display an indication that permits the user to recognize the connected power supply, on the displaying portion 42.

According to the power supply controlling circuit of the present invention, the power supply can be received from two USB ports provided with the information processing apparatus such as the computer, or the like. Also, the power supply controlling circuit capable of controlling adequately the two-system power supply in both the case where the power is supplied from the AC power source as the external power source via the AC adaptor and the case where the power is supplied from two USB ports provided with the information processing apparatus such as the computer, or the like without connection of the external power source can be provided.

Also, the scanner unit of the present invention, the two-system power supplying portion is provided, and a reading operation of the scanner unit is carried out when the power is supplied from two USB ports provided with the information processing apparatus such as the computer, or the like. Therefore, since an image reading speed and a transferring speed of data are controlled by supplying stably the power to the driving portion for driving a paper feeding mechanism, or the like, for example, the scanner unit capable of suppressing a reduction in a processing speed to the utmost can be provided.

As described above, the power supply controlling circuit according to the present invention can be widely applied to a wide variety of industrial fields, particularly the field of an input/output apparatus equipped with a two-system power supplying portion to which a power is supplied from an information processing apparatus such as a computer, or the like. Therefore, the present invention is very useful to the power supply controlling circuit that can control adequately two-system power supply in both a case where a power is supplied from an AC power source as an external power source via an AC adaptor and a case where a power is supplied from two USB ports provided with the computer without connection of the external power source.

What is claimed is:

1. A power supply controlling circuit, comprising:
   power supplied portions, adapted to receive power supply from at least one external apparatus;
   a first power unit, adapted to be driven by a first power; and
   a second power unit, adapted to be driven by a second power, wherein
   in response to a change of the power supply, a level of the second power is varied, while a level of the first power is maintained.

2. The power supply controlling circuit according to claim 1, wherein
   the power supplied portions include a first power supplied portion and a second power supplied portion,
   the at least one external apparatus includes an AC adaptor and an information processing apparatus including a first and second USB interfaces,
   the first power supplied portion is connected to the first USB interface of the information processing apparatus, and
   the second power supplied portion is selectively connected to the second USB interface of the information processing apparatus and the AC adaptor.

3. A scanner unit, incorporating the power supply controlling circuit according to claim 1, and connected to an information processing apparatus.

4. The scanner unit according to claim 3, wherein
   the power supply controlling circuit outputs an informing signal indicating a power supply mode to the information processing apparatus.

5. The scanner unit according to claim 3, wherein the second power unit of the supply controlling circuit powers a motor controlling unit and a reading controlling unit of the scanner unit.

6. The scanner unit according to claim 5, wherein the motor controlling unit controls a driving motor for driving transport rollers of the scanner unit for transporting a sheet.

7. The scanner unit according to claim 5, wherein the reading controlling unit controls a quantity of light supplied to the scanner unit for illuminating a sheet.

8. A power supply controller, comprising:
   a first portion adapted to be connected to a first port of a first external apparatus;
   a second portion adapted to be connected to one of a second port of the first external apparatus and a second external apparatus;
   a power unit adapted to receive a power supply from one or both of the first external apparatus and the second external apparatus, the power unit including a first power unit adapted to receive a first power from either the first portion or the second portion and a second power unit adapted to receive a second power from the second portion; and
   a control unit adapted to constantly maintain the first power and vary the second power.

* * * * *

UNITED STATES PATENT AND TRADEMARK OFFICE
CERTIFICATE OF CORRECTION

PATENT NO. : 8,161,298 B2
APPLICATION NO. : 11/905967
DATED : April 17, 2012
INVENTOR(S) : Satoshi Kubo et al.

It is certified that error appears in the above-identified patent and that said Letters Patent is hereby corrected as shown below:

Title page Column 2 (References Cited), After "2008/0122292 A1   5/2008 Minami ..............  307/44", insert -- 2002/0171694 A1 11/2002 Takayanagi --

Title page Column 2 (References Cited), After "JP   2005-141732   6/2005",
insert -- JP   2002-268756   09/2002
         JP   2002-321347   11/2002 --

Title page Column 2 (References Cited), After "Japanese Office Action issued on Jan. 27, 2011 in corresponding Japanese patent application No. 2007-065092." insert -- Japanese Office Action issued on Jan. 24, 2012 in corresponding Japanese patent application no. 2007-065092. --

Signed and Sealed this
Eighteenth Day of September, 2012

David J. Kappos
*Director of the United States Patent and Trademark Office*